(12) United States Patent
Hirshberg

(10) Patent No.: US 9,032,010 B2
(45) Date of Patent: May 12, 2015

(54) INTEGER DIVIDER MODULE

(71) Applicant: Mellanox Technologies Ltd., Yokneam (IL)

(72) Inventor: Eitan Hirshberg, Pardes Hana Karkur (IL)

(73) Assignee: Mellanox Technologies Ltd., Yokneam (IL)

( * ) Notice: Subject to any disclaimer, the term of this patent is extended or adjusted under 35 U.S.C. 154(b) by 297 days.

(21) Appl. No.: 13/664,428

(22) Filed: Oct. 31, 2012

(65) Prior Publication Data

US 2014/0122556 A1    May 1, 2014

(51) Int. Cl.
*G06F 7/52*        (2006.01)
*G06F 7/535*       (2006.01)

(52) U.S. Cl.
CPC ........ *G06F 7/535* (2013.01); *G06F 2207/5355* (2013.01)

(58) Field of Classification Search
USPC .......................................................... 708/654
See application file for complete search history.

(56) References Cited

U.S. PATENT DOCUMENTS

| | | | |
|---|---|---|---|
| 7,979,486 B2 * | 7/2011 | Harrison et al. | 708/654 |
| 8,694,573 B2 * | 4/2014 | Bhattacharjee et al. | 708/654 |

\* cited by examiner

*Primary Examiner* — Tan V. Mai
(74) *Attorney, Agent, or Firm* — D. Kligler I.P. Services Ltd.

(57) ABSTRACT

A method includes receiving a dividend and a divisor for performing a division operation. Numbers p and n are found, for which the divisor equals $2^n(1+2^p)$. An interim result, which is equal to a reciprocal of $1+2^p$ multiplied by the dividend, is calculated. The interim result is divided by $2^n$ to produce a result of the division operation.

18 Claims, 1 Drawing Sheet

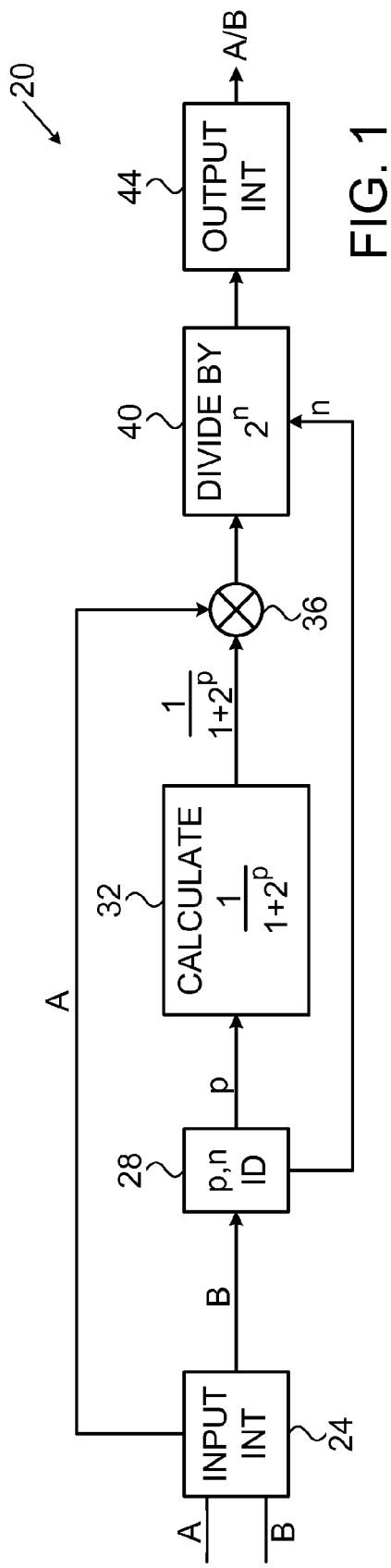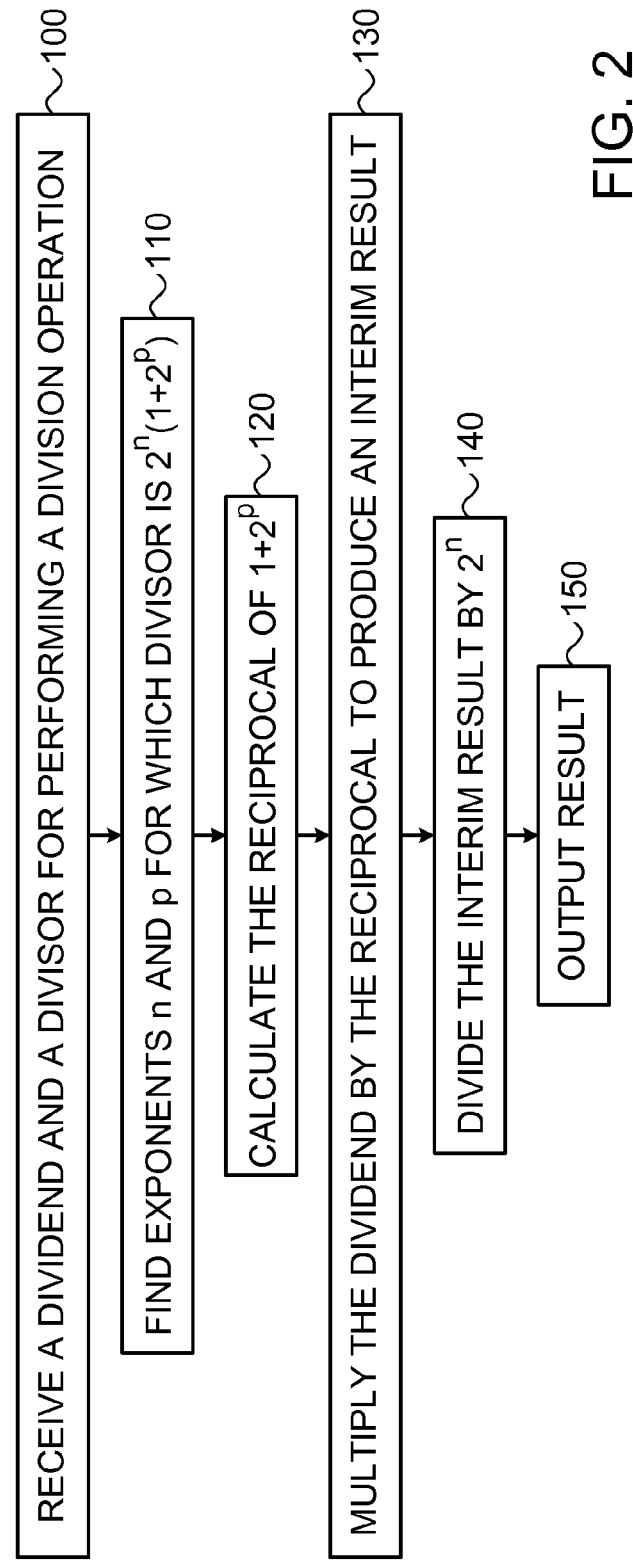

derleft="0">
INTEGER DIVIDER MODULE

FIELD OF THE INVENTION

The present invention relates generally to digital circuits, and particularly to methods and devices for performing integer division.

BACKGROUND OF THE INVENTION

Digital systems often comprise different digital circuit blocks to realize different logical functions. For example, digital dividers are used to perform division computations on binary numbers.

SUMMARY OF THE INVENTION

An embodiment of the present invention that is described herein provides a method including receiving a dividend and a divisor for performing a division operation. Numbers p and n are found, for which the divisor equals $2^n(1+2^p)$. An interim result, which is equal to a reciprocal of $1+2^p$ multiplied by the dividend, is calculated. The interim result is divided by $2^n$ to produce a result of the division operation.

In some embodiments, calculating the interim result includes evaluating a binary fraction having a pattern of alternating runs of p binary "1"s and p binary "0"s after the binary point. In an embodiment, calculating the interim result includes evaluating a finite number of terms in a power series of $1/2^{2p}$. Evaluating the finite number of the terms may include evaluating a first number of the terms recursively from a second number of the terms that is smaller than the first number. In an example embodiment, receiving the dividend includes receiving a size of a memory, receiving the divisor includes receiving a length of a record in the memory, and the division operation finds a number of records in the memory.

There is additionally provided, in accordance with an embodiment of the present invention, apparatus including an interface and a divider module. The interface is configured to receive a dividend and a divisor for performing a division operation. The divider module is configured to find numbers p and n for which the divisor equals $2^n(1+2^p)$, to calculate an interim result that is equal to a reciprocal of $1+2^p$ multiplied by the dividend, and to divide the interim result by $2^n$ to produce a result of the division operation.

The present invention will be more fully understood from the following detailed description of the embodiments thereof, taken together with the drawings in which:

BRIEF DESCRIPTION OF THE DRAWINGS

FIG. 1 is a block diagram that schematically illustrates an integer divider module, in accordance with an embodiment of the present invention; and FIG. 2 is a flow chart that schematically illustrates a method for integer division, in accordance with an embodiment of the present invention.

DETAILED DESCRIPTION OF EMBODIMENTS

Overview

Embodiments of the present invention that are described herein provide improved methods and systems for implementing integer divider modules. The divider modules described herein are applicable for any divisor that can be expressed as a sum of two exponential terms of base two, i.e., as DIVISOR=$2^m+2^n$ wherein exponents m and n are integers, or equivalently DIVISOR=$2^n(1+2^p)$ wherein p=m−n is also integer.

For a divisor of this form, the term 1/DIVISOR can be expressed as a binary fraction comprising alternating runs of size p of binary "1"s and "0"s, which is simple to implement in digital hardware. Thus, in some embodiments the divider module identifies the values of n and p, calculates $1/(1+2^p)$ using the above-described binary fraction, and then multiplies the result by the dividend and divides by $2^n$ to produce the final result. These calculations can be implemented using simple hardware and with small computational complexity. In some embodiments the divider evaluates the binary fraction up to a desired accuracy using a recursive calculation.

When using the disclosed configurations, the computation time has only a logarithmic dependence on the size of the dividend instead of a linear dependence as in conventional long binary division. Thus, the embodiments presented herein significantly improve the computational efficiency and power consumption of the division operation without adding a significant number of logic circuits.

System Description

FIG. 1 is a block diagram that schematically illustrates a block diagram that schematically illustrates an integer divider module 20, in accordance with an embodiment of the present invention. The integer divider module in the embodiment shown in FIG. 1 is configured to divide a dividend denoted A by a DIVISOR denoted B. DIVISOR is an integer of the form $2^m+2^n$, which can be further represented as $2^n(1+2^p)$, where p=m−n when m>n.

Such integer divider modules may be used in a variety of applications. Divisors that are sums of powers of two are common in memory allocation tables or memory maps, used for example in data integrity fields (DIF) for protecting data in storage devices. In such an example, data items of size $2^m$ may be written into memory, with each data item protected by a signature of size $2^n$. The total record size is thus $2^m+2^n$. For example, a memory may store 512-byte data words and an 8-byte signature, of which 2 bytes comprise a Cyclic Redundancy Check (CRC). In order to derive the number of rows from the total memory size, or to perform other memory-related calculations, it is necessary to perform division by $2^m+2^n$. Thus, the disclosed divider configurations can be embedded in any system or device that accesses memory, e.g., in communication devices such as Network Interface Cards (NICs) or network elements.

Divider 20 of FIG. 1 comprises an input interface 24, which receives dividend A and divisor B. DIVISOR B is the input to an identification (ID) block 28, which is configured to identify the exponents p and n in the exponent term of the DIVISOR of the form $2^n(1+2^p)$. A reciprocal calculation block 32 is configured to calculate the value of $1/(1+2^p)$ which then multiplies the dividend A from input interface 24 in a multiplier block 36 to produce an interim result.

The interim result is then the input to a shifter block 40, which divides the interim result from multiplier 36 by $2^n$ to compute the quotient A/B, where n was obtained from ID block 28. (Division by $2^n$ is typically implemented by applying n shift-right operations.) An output interface 44 outputs the result A/B of the division operation from the divider module. The configuration of integer divider module 20 shown in FIG. 1 is by way of example, and not by way of limitation of the embodiments of the present invention. In alternative embodiments, any other suitable divider configuration can be used. For example, the integer divider described in the embodiments of the present invention comprises a divisor with sum of two exponentials of base 2. However, in a system or application that performs arithmetic operations in another, non-binary base, the disclosed division techniques can be implemented, mutatis mutandis, for divisors that comprise a sum of two exponentials of any base.

In some embodiments, divider 20 is used as part of a general divider, which is not limited to divisors that are sums of powers of two. Such a general divider would typically comprise an additional integer divider (not shown in the figures) that performs conventional division. In these embodiments, if the divisor is found to be a sum of powers of two, then the division operation is carried out by divider 20. Otherwise, the division operation is carried out by the additional divider. In some embodiments, divider 20 and the additional divider may share some common hardware (e.g., shifters, adders and/or registers) so as to reduce the overall hardware size and cost.

Divider module 20 may be implemented in hardware using digital circuit blocks. Divider module 20 may be further implemented in one or more Application-Specific Integrated Circuits (ASICs) or Field-Programmable Gate Arrays (FPGAs). Additionally or alternatively, some elements of divider module 20 can be implemented using software, or using a combination of hardware and software elements. In some embodiments, divider 20 can be implemented using a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. Additionally or alternatively, the divider may be implemented in a separate packaged integrated circuit. The divider may be integrated in a semiconductor chip, system-on-chip (SoC), system-on-package (SoP), or implemented within any suitable digital system.

FIG. 2 is a flow chart that schematically illustrates method for integer division using integer divider module 20, in accordance with an embodiment of the present invention. In a receiving step 100, divider module 20 receives dividend A and divisor B for performing a division operation. In a finding step 110, ID block 28 finds the exponents n and p for which the divisor is of the form $2^n(1+2^p)$. In a calculating step 120, block 32 calculates the reciprocal of $1+2^p$. In a multiplying step 130, multiplier 36 multiplies the dividend A by the reciprocal from step 120 to produce an interim result. In a dividing step 140, shifter block 40 divides the interim result by $2^n$. In an outputting step 150, output interface 44 of divider module 20 outputs the result of the division operation, i.e., the quotient A/B.

Mathematical Derivation of Integer Divider Module Configuration

As explained above, DIVISOR can be written as $2^m+2^n=2^n(1+2^p)$. Setting aside the division by $2^n$, which is performed later by shifter module 40, the division operation is equivalent to multiplication by $1/(1+2^p)$. The evaluation of $1/(1+2^p)$ is carried out by block 32.

As will be shown below, the term $1/(1+2^p)$ can be written as a binary fraction comprising an infinite pattern of alternating runs of p-ones and p-zeros after the binary point. Table 1 shows this property for several values of p and n=0:

TABLE 1

| Binary representation of $1/(1 + 2^p)$ | | |
|---|---|---|
| DIVISOR (Decimal) | p | $1/(1 + 2^p)$ (Binary) |
| $1 + 2 = 1 + 2^1 = 3$ | 1 | 0.01010101010101010101... |
| $1 + 4 = 1 + 2^2 = 5$ | 2 | 0.00110011001100110011... |
| $1 + 8 = 1 + 2^3 = 9$ | 3 | 0.000111000111000111... |
| $1 + 16 = 1 + 2^4 = 17$ | 4 | 0.0000111100001111... |
| $1 + 32 = 1 + 2^5 = 33$ | 5 | 0.00000111110000011111... |

Multiplication by a binary fraction of this form can be easily realized in hardware using full adders, shifters, and a decrementor, using the derivation below. The term $$2^p \times \left(\frac{1}{\text{DIVISOR}}\right)$$

can be expanded as a power series of $1/2^{2p}$ as follows:

$$2^p \times \left(\frac{1}{\text{DIVISOR}}\right) = \left\{\frac{1}{2^p} \times (2^p - 1)\right\}\left\{1 + \frac{1}{2^{2p}} + \frac{1}{2^{4p}} + \frac{1}{2^{6p}} + \frac{1}{2^{8p}} + \frac{1}{2^{10p}} + \dots \right\} \quad (1)$$

Equation (1) represents $$2^p \times \left(\frac{1}{\text{DIVISOR}}\right)$$

as an alternating pattern of runs of p-ones and p-zeroes after the binary point similar to the series of 1/DIVISOR shown in Table 1. The term $$\left\{\frac{1}{2^p} \times (2^p - 1)\right\}$$

in Equation (1) generates a run of p-binary "1"s after the binary point. Each term in the power series of $$\frac{1}{2^{2p}}$$

concatenates another run of p-"0"s and a run of p-"1"s as shown in Table 2 for several values of p:

TABLE 2

Example terms in the power series of Equation (1)

| p | $\left\{\dfrac{1}{2^p} \times (2^p - 1)\right\}$ | $\left\{\dfrac{1}{2^p}(2^p - 1)\right\}\left\{1 + \dfrac{1}{2^{2p}}\right\}$ | $\left\{\dfrac{1}{2^p}(2^p - 1)\right\}\left\{1 + \dfrac{1}{2^{2p}} + \dfrac{1}{2^{4p}}\right\}$ |
|---|---|---|---|
| 1 | 0.1 | 0.101 | 0.10101 |
| 2 | 0.11 | 0.110011 | 0.1100110011 |
| 3 | 0.111 | 0.111000111 | 0.111000111000111 |
| 4 | 0.1111 | 0.111100001111 | 0.111100001111100001111 |
| 5 | 0.11111 | 0.111110000011111 | 0.111110000011111000001111 |

In some embodiments, block 32 in divider 20 evaluates a certain number of terms in the power series of $1/2^{2p}$, to match the desired calculation accuracy. As p increases, the number of digits after the binary point increases per term, as shown in Table 2, and the accuracy of representing $$2^p \times \left(\frac{1}{\text{DIVISOR}}\right)$$

increases accordingly.

Stated differently, p increases the number of digits after the binary point for each additional term in the power series such that every term add 2 digits after the binary point for p=1, for example. Similarly, each additional term in the power series adds 8 digits after the binary point for p=4.

From the hardware standpoint, fewer adders are needed as p increases. Accuracy requirements of the computation determine the number of digits after the binary point that are needed in the finite series, which is on the order of N, the size of the dividend (approximately round_up(log 2(DIVIDEND))).

In some embodiments, for further reduction of hardware cost, power consumption and hardware size, block 32 may compute the power series terms on the right side of equation (1) by performing one or more recursive iteration loops, where i is an integer denoting the iteration index as in the following Equations (2)-(4) for n=0:

$$F_1 = 1 + \frac{1}{2^{2p}} \quad (2)$$

$$F_2 = 1 + \frac{1}{2^{2p}} + \frac{1}{2^{4p}} + \frac{1}{2^{6p}} = \quad (3)$$

$$\left(1 + \frac{1}{2^{2p}}\right) + \frac{1}{2^{4p}} \times \left(1 + \frac{1}{2^{2p}}\right) = F_1 + \frac{1}{2^{4p}} \times F_1$$

$$F_{i+1} = F_i + \frac{1}{2^{2^{(i+1)}p}} \times F_i \quad (4)$$

In Equations (2)-(4), $F_i$ is the result of the $i^{th}$ iteration loop. One iteration loop computation requires one adder circuit and one shifter circuit. Each iteration loop also doubles the number of bits after the binary point. Compared to a conventional long division, the disclosed divider has a significant reduction in the computation time. The computation time is reduced from N iterations for conventional long division to $\log_2(N)$ for the disclosed divider module. The methods for optimizing the integer divider module described above are for conceptual clarity, and not by way of limitation of the embodiments of the present invention.

In some cases, multiplying DIVIDEND by the reciprocal of $1+2^p$ is still computationally complex. In an alternative embodiment, another algorithm can be used to further optimize the integer divider module by expressing the quotient A*(1/B) in a power series expansion and evaluating the quotient using one or more recursive iteration loops in contrast to the embodiment previously described where an additional computation step of the multiplying A with the reciprocal of $1+2^p$ (e.g., 1/B) was required to produce the interim quotient result.

In other words, steps 120 and 130 of the method of FIG. 2 are not necessarily separate. In the alternative embodiment, block 32 may calculate DIVIDEND/$(1+2^p)$ instead of $1/(1+2^p)$. The recursive calculation of equations (2)-(4) can be modified accordingly.

In this embodiment, the quotient Q=DIVIDEND/DIVISOR=A*(1/B) may be computed in a recursive iteration loop denoted $Q_i$ for the $i^{th}$ iteration step given by equations (5) and (6).

$$Q_0 = \frac{1}{2^p} \times \text{DIVIDEND} - \frac{1}{2^{2p}} \times \text{DIVIDEND} \quad (5)$$

$$Q_{i+1} = Q_i + \frac{1}{2^{2^{(i+1)}p}} \times Q_i \quad (6)$$

where M is an integer and provides the desired accuracy. Equations (5) and (6) are derived from Equations (1)-(4) for n=0 by evaluating a finite number of terms in a power series of $1/2^{2p}$. However, the iteration loop computes the quotient Q by bundling DIVIDEND as in Equation (5) into the iteration loop. This eliminates the extra multiplication step of DIVIDEND with the reciprocal of $1+2^p$ as described in the previous embodiment.

After i=M iterations in the recursive quotient Q computation, M iterations are used to match the desired calculation accuracy. Each iteration step can be realized using a single shifter and a single adder/subtractor. Stated differently, in the embodiment presented here, quotient A*(1/B) is directly computed in an iteration loop to directly produce the interim result without an additional multiplication computation step of A by 1/B=(1/DIVISOR) as in the embodiment described in equations (1)-(4), which makes the computation of Q much simpler and more efficient.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of dividing by a divisor having the form $2^n(1+2^p)$, where p, n are integers, comprising:
   receiving a dividend and a divisor, by an integer divider module, for performing a division operation;
   finding, by the integer divider module, numbers p and n for which the divisor equals $2^n(1+2^p)$;
   calculating an interim result that is equal to a reciprocal of $1+2^p$ multiplied by the dividend, and
   dividing the interim result by $2^n$, by a dedicated hardware unit, to produce a result of the division operation.

2. The method according to claim 1, wherein calculating the interim result comprises evaluating a binary fraction having a pattern of alternating runs of p binary "1"s and p binary "0"s after the binary point.

3. The method according to claim 1, wherein calculating the interim result comprises evaluating a finite number of terms in a power series of $1/2^{2p}$.

4. The method according to claim 3, wherein evaluating the finite number of the terms comprises evaluating a first number of the terms recursively from a second number of the terms that is smaller than the first number.

5. The method according to claim 1, wherein receiving the divisor comprises receiving a length of a record in a memory.

6. The method according to claim 1, wherein dividing the interim result by $2^n$ comprises shifting the interim result by a shifter.

7. The method according to claim 1, comprising
   determining, by a dedicated hardware determination unit, whether the divisor is a sum of two integer powers of two;
   if the divisor is not a sum of two integer powers of two, dividing the dividend by the divisor by a general divider; and
   if the divisor is determined to be a sum of two integer powers of two, performing the acts of finding numbers p and n, calculating the interim result and dividing the interim result by $2^n$.

8. The method according to claim 1, wherein calculating the interim result comprises calculating a reciprocal of $1+2^p$ and multiplying the reciprocal by the dividend.

9. The method according to claim 1, wherein calculating the interim result comprises calculating a sum of terms of a series.

10. An apparatus, comprising:
    an interface, which is configured to receive a dividend and a divisor for performing a division operation; and
    a divider module, which is configured to find numbers p and n for which the divisor equals $2^n(1+2^p)$, to calculate an interim result that is equal to a reciprocal of $1+2^p$ multiplied by the dividend, and to divide the interim result by $2^n$, by a dedicated hardware unit, to produce a result of the division operation.

11. The apparatus according to claim 10, wherein the divider module is configured to calculate the interim result by evaluating a binary fraction having a pattern of alternating runs of p binary "1"s and p binary "0"s after the binary point.

12. The apparatus according to claim 10, wherein the divider module is configured to calculate the interim result by evaluating a finite number of terms in a power series of $1/2^{2p}$.

13. The apparatus according to claim 12, wherein the divider module is configured to evaluate a first number of the terms recursively from a second number of the terms that is smaller than the first number.

14. The apparatus according to claim 10, and comprising a memory, and wherein the result of the division operation is provided to the memory in accessing the memory.

15. The apparatus according to claim 10, wherein the dedicated hardware unit comprises a shifter which performs the division of the interim result by $2^n$.

16. The apparatus according to claim 10, comprising a dedicated hardware determination unit configured to determine whether the divisor is a sum of two integer powers of two, if the divisor is not a sum of two integer powers of two, to initiate dividing the dividend by the divisor by a general divider, and if the divisor is determined to be a sum of two integer powers of two, to initiate dividing the dividend by the divisor, by the divider module.

17. The apparatus according to claim 10, wherein the divider module is configured to calculate the interim result by calculating a reciprocal of $1+2^p$ and multiplying the reciprocal by the dividend.

18. The apparatus according to claim 10, wherein the divider module is configured to calculate the interim result by calculating a sum of terms of a series.

* * * * *